US011622144B2

(12) United States Patent
Heiman et al.

(10) Patent No.: US 11,622,144 B2
(45) Date of Patent: Apr. 4, 2023

(54) ACTIVE VIDEO BANDWIDTH MANAGEMENT USING SDV CONTROL

(71) Applicant: ARRIS Enterprises LLC, Suwanee, GA (US)

(72) Inventors: Robert S. Heiman, Warrington, PA (US); Thomas L. du Breuil, Ivyland, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/952,357

(22) Filed: Nov. 19, 2020

(65) Prior Publication Data
US 2021/0160559 A1 May 27, 2021

Related U.S. Application Data

(60) Provisional application No. 62/938,525, filed on Nov. 21, 2019.

(51) Int. Cl.
*H04N 21/2662* (2011.01)
*H04N 19/61* (2014.01)
(Continued)

(52) U.S. Cl.
CPC ......... *H04N 21/2662* (2013.01); *H04N 19/61* (2014.11); *H04N 21/4347* (2013.01); *H04N 21/6405* (2013.01)

(58) Field of Classification Search
CPC .......... H04N 21/2662; H04N 21/4347; H04N 21/6405; H04N 19/61
See application file for complete search history.

(56) References Cited

U.S. PATENT DOCUMENTS

| 10,057,609 | B2 * | 8/2018 | Rieger | H04N 21/23439 |
| 2007/0177632 | A1 * | 8/2007 | Oz | H04N 21/2187 348/E7.071 |
| 2008/0159128 | A1 * | 7/2008 | Shaffer | H04W 28/0284 370/235 |

(Continued)

FOREIGN PATENT DOCUMENTS

AU 2014201280 B2 5/2015

OTHER PUBLICATIONS

International Search Report and Written Opinion Re: Application No. PCT/US2020/061191; dated Feb. 15, 2021.

(Continued)

*Primary Examiner* — James R Sheleheda
(74) *Attorney, Agent, or Firm* — Chernoff, Vilhauer, McClung & Stenzel, LLP

(57) ABSTRACT

Methods and systems to manage narrowcast bandwidth are disclosed. In one embodiment, the method includes receiving a channel tune request from a set top box associated with a service group, and determining whether current total bandwidth use by the service group is at or above a first predetermined threshold. The method additionally includes multicasting a high bitrate version of a requested channel to the set top boxes of the service group when the current total bandwidth use by the service group is below the first predetermined threshold. The requested channel corresponds to the received channel tune request. The method further includes multicasting a low bitrate version of the requested channel to the set top boxes of the service group when the current total bandwidth use by the service group is at or above the first predetermined threshold.

9 Claims, 6 Drawing Sheets

(51) Int. Cl.
*H04N 21/434* (2011.01)
*H04N 21/6405* (2011.01)

(56) References Cited

U.S. PATENT DOCUMENTS

| | | | | | |
|---|---|---|---|---|---|
| 2008/0244667 | A1* | 10/2008 | Osborne | ............ | H04N 21/2225 348/E7.071 |
| 2009/0025027 | A1* | 1/2009 | Craner | ................ | H04N 21/233 725/32 |
| 2009/0025052 | A1* | 1/2009 | Schlack | ............ | H04N 21/6377 725/116 |
| 2009/0168679 | A1* | 7/2009 | Benjamim | ......... | H04N 21/6405 370/312 |
| 2010/0086020 | A1* | 4/2010 | Schlack | .................. | H04L 67/61 375/240.01 |
| 2011/0126244 | A1* | 5/2011 | Hasek | ................ | H04N 21/6377 725/87 |
| 2012/0180101 | A1* | 7/2012 | Davis | ................ | H04N 21/6118 725/116 |
| 2012/0203822 | A1* | 8/2012 | Floyd | ..................... | H04L 47/22 709/226 |
| 2012/0311093 | A1 | 12/2012 | Garg et al. | | |
| 2013/0132968 | A1* | 5/2013 | Kivity | ....................... | G06F 9/32 718/104 |
| 2014/0082681 | A1* | 3/2014 | Brown | .................... | H04L 43/16 725/98 |
| 2015/0382030 | A1* | 12/2015 | Rieger | ................. | H04N 21/252 725/96 |
| 2019/0191197 | A1 | 6/2019 | DuBreuil et al. | | |

OTHER PUBLICATIONS

Access, Terminals, Transmission and Multiplexing (ATTM) Integrated Broadband Cable and Television Networks Converged Multiservice Access Platform Architecture11 , ETSI Draft; AT3013V001, European Telecommunications Standards Institute (ETSI), 650, Route Des Lucioles ; F-06921 Sophia-Antipolis ; France, Mar. 3, 2011 (Mar. 3, 2011), pp. 1-39, XP014062317.

* cited by examiner

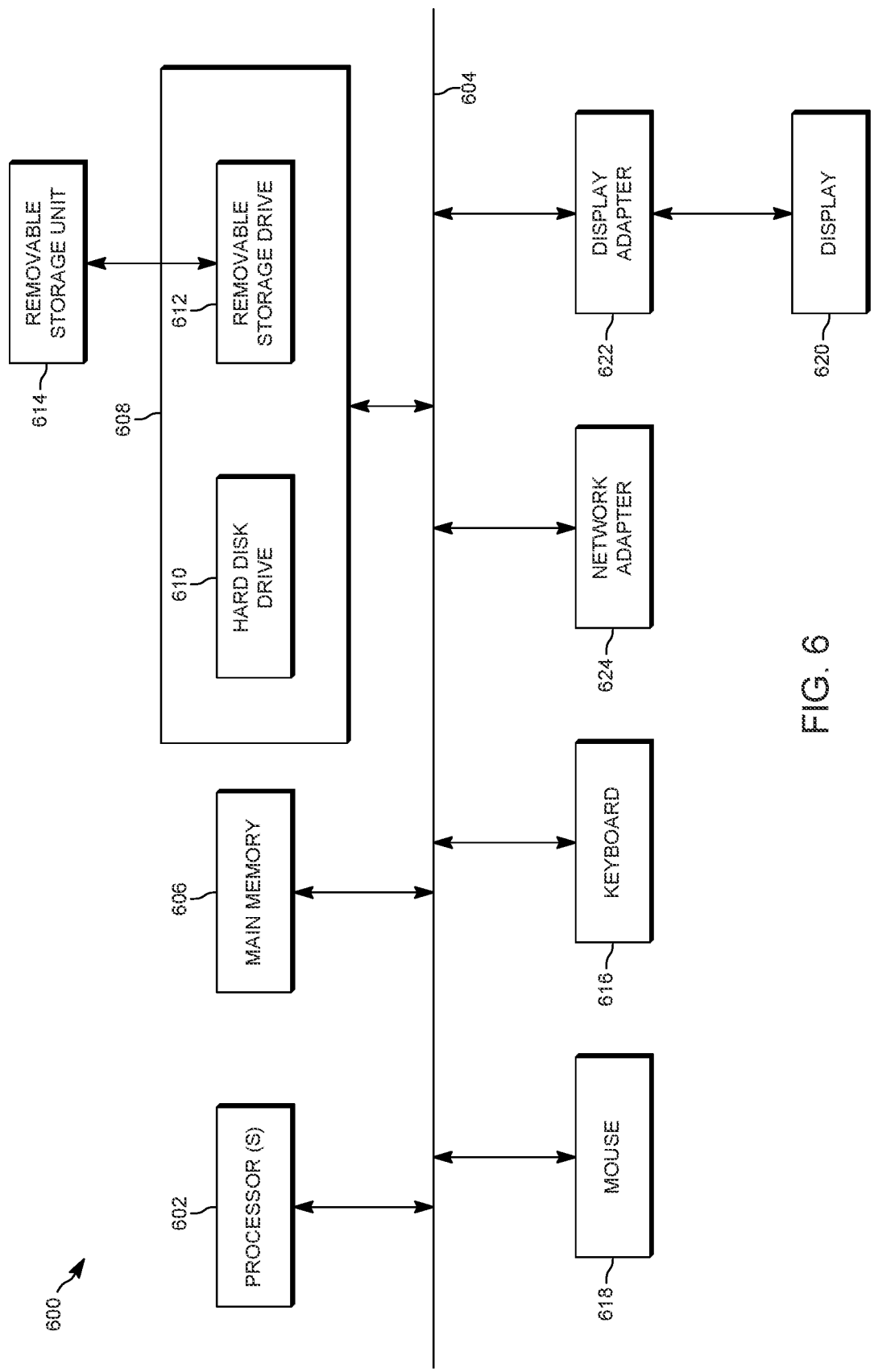

ACTIVE VIDEO BANDWIDTH MANAGEMENT USING SDV CONTROL

CROSS REFERENCE TO RELATED APPLICATIONS

This application claims the benefit of U.S. Provisional Patent Application Ser. No. 62/938,525 filed Nov. 21, 2019 and entitled "Active Video Bandwidth Management Using SDV Control." The complete disclosure of the above application is hereby incorporated by references for all purposes.

BACKGROUND

The subject matter of this application relates to active video bandwidth management using switched digital video control.

Switched digital video (SDV) systems currently operate with a rate capped video content in order to more efficiently and economically utilize the quadrature amplitude modulation (QAM) video distribution systems. A typical solution may use a rate cap of 3.75 Mbps for MPEG-2 SD and 14 Mbps for MPEG-2 HD, which supports up to 10 SD channels or 2 HD and 2 SD in a single 6 MHz 256 QAM (38.8 Mbps) system. The rate capping (such as via transcoding) is typically performed by a rate shaping product, such as the ARRIS CAP1000, because most of the content arrives as a variable bitrate into the service provider's distribution facilities. The main benefit of a SDV system is that content will not be broadcasted on the network if no subscriber requests to watch the specific content, thus saving bandwidth that can be used by other viewers on the system and/or for other services, such as high speed data.

SDV systems are defined with rate-capped bitrates and fixed narrowcast bandwidth is allocated to a system to carry the content. Operators also may have both traditional (nominal SDV) linear video and video on-demand (VOD) services sharing the same pool of narrowcast QAM bandwidth. The systems are typically sized such that demand for the narrowcast bandwidth can be met during peak usage times in order to meet the peak bandwidth requirements to prevent a denial of service resulting from insufficient allocated narrowcast bandwidth. While service providers using SDV systems have recovered significant amounts of bandwidth in their networks, there is increasing pressure to free up more bandwidth because of the increasing demand for high-speed data services and VOD content services. What is desired, therefore, is a way to increase availability of bandwidth using SDV systems.

BRIEF DESCRIPTION OF THE DRAWINGS

For a better understanding of the invention, and to show how the same may be carried into effect, reference will now be made, by way of example, to the accompanying drawings, in which:

FIG. 6 is a block diagram of an example of a computing apparatus that may be configured to implement or execute one or more of the processes performed by any of the various devices described herein.

DETAILED DESCRIPTION

Figure 1:
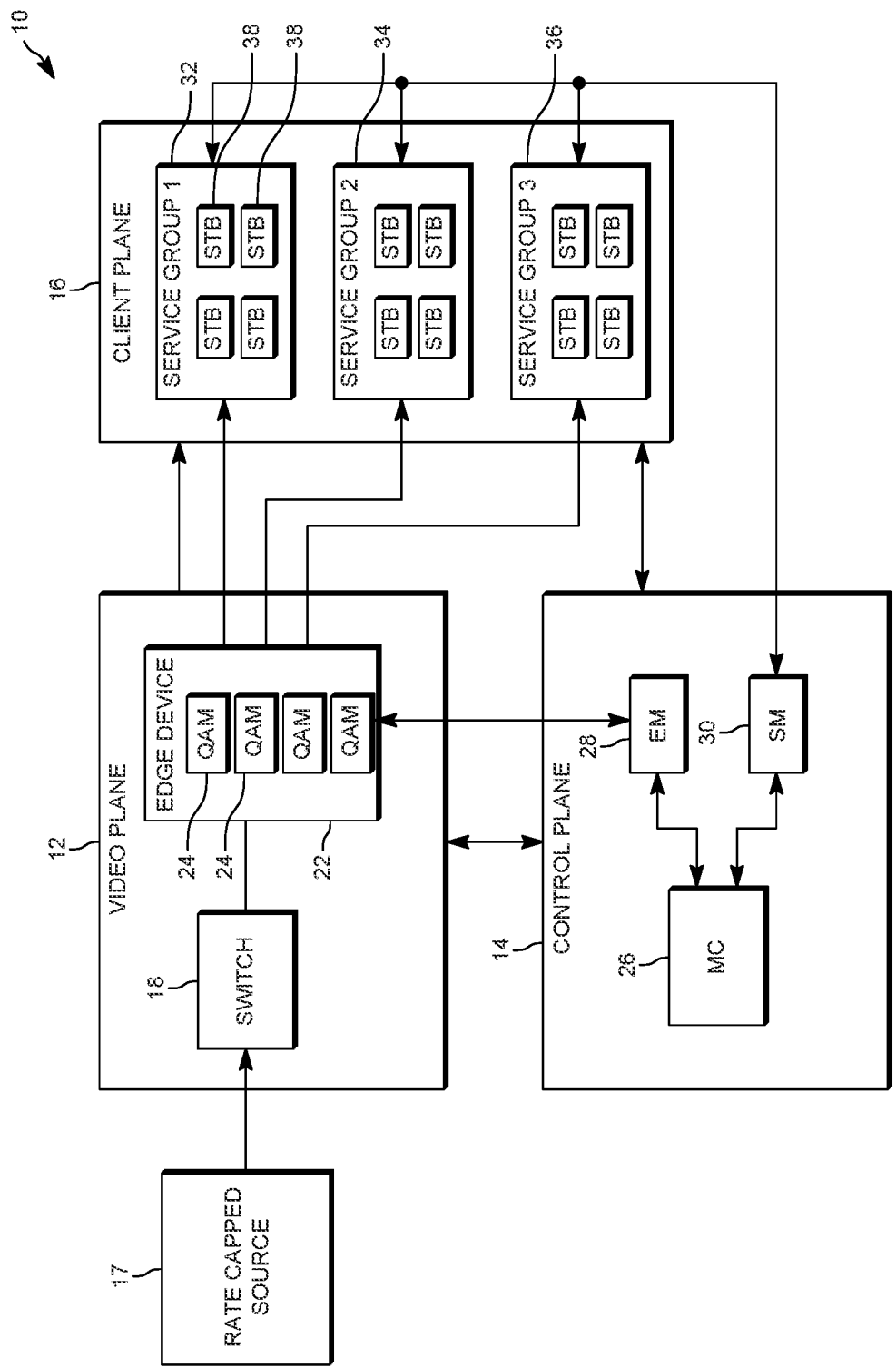
FIG. 1 is a high-level block diagram of an example of a SDV system.

Referring to FIG. 1, an illustrative example of a SDV system 10 is shown. The SDV system includes a video plane 12, a control plane 14, and a client plane 16. Video plane 12 receives programs from a rate capped source 17, sends SDV video traffic to the client plane, and communicates SDV control traffic with the control plane. Client plane 16 receives the SDV video traffic from the video plane and communicates interactive program requests with the control plane. The SDV system may include components prior to the rate capped source, such as satellite receivers, rate capping/transcoding equipment, and/or other video processing equipment.

In the example shown in FIG. 1, video plane 12 includes a switch 18, such as a Gigabit Ethernet (GigE) switch, which receives programs from rate capped source 17, such as a content source or content delivery network, and delivers "joined" programs to an edge device 22 having a plurality of edge QAM modulators 24. The number of edge QAM modulators may vary as needs dictate. As used herein, the term "QAM" refers to modulation schemes used for sending signals over cable access networks. Such modulation schemes may use any constellation level (e.g., QAM-16, QAM-64, QAM-256, etc.) depending on the details of a cable access network. Typically, a single QAM modulator can output a multiplex of ten or twelve programs, although the actual number will be dictated by a number of factors, including the communication standard that is employed. Edge device 22 sends requests to "join" programs to switch 18, sends QAM allocation status information to the edge resource manager of control plane 14 (further discussed below), receives program request and QAM allocation instructions from that edge resource manager, and delivers modulated content to set-top boxes of client plane 16. Video plane 12 may include other components, such as signal aggregators, digital multiplexers, encryption devices, combiners, and/or other video processing equipment.

Control plane 14 includes a management console (MC) 26, such as a Switched Video Operations Manager (SVOM), which configures and controls edge resource manager (EM) 28 and SDV session manager (SM) 30. Additionally, MC 26 receives QAM allocation status and history from EM 28, and also receives SM managing set-top box service group information and channel change status information and its history from SM 30. EM 28 receives QAM allocation status information from edge device 22 and sends that information and its history to MC 26. Additionally, EM 28 sends program requests and QAM allocation instructions to edge device 22 and communicates with SM 30. SM 30 receives SM managing set-top box service group information and program requests from the set-top boxes of client plane 16 and sends the SM managing set-top box service group information and channel change status information and its history to MC 26. Additionally, SM 30 sends configuration information (such as initialization instructions) and updated channel maps to the set-top boxes of client plane 16 and also monitors the status of those set-top boxes. The control plane may include other components, such as an application switch.

Client plane 16 includes a plurality of service groups, such as first service group 32, second service group 34, and third service group 36. Each of the service groups has a plurality of set-top boxes (STBs) 38. The client plane may have any suitable number of service groups and each of those service groups may have any suitable number of STBs. The STBs receive modulated content from edge device 22. Additionally, STBs 38 receive configuration information (such as initialization instructions) and updated channel maps from SM 30 and may send service group discovery information and program requests to SM 30.

Figure 2:
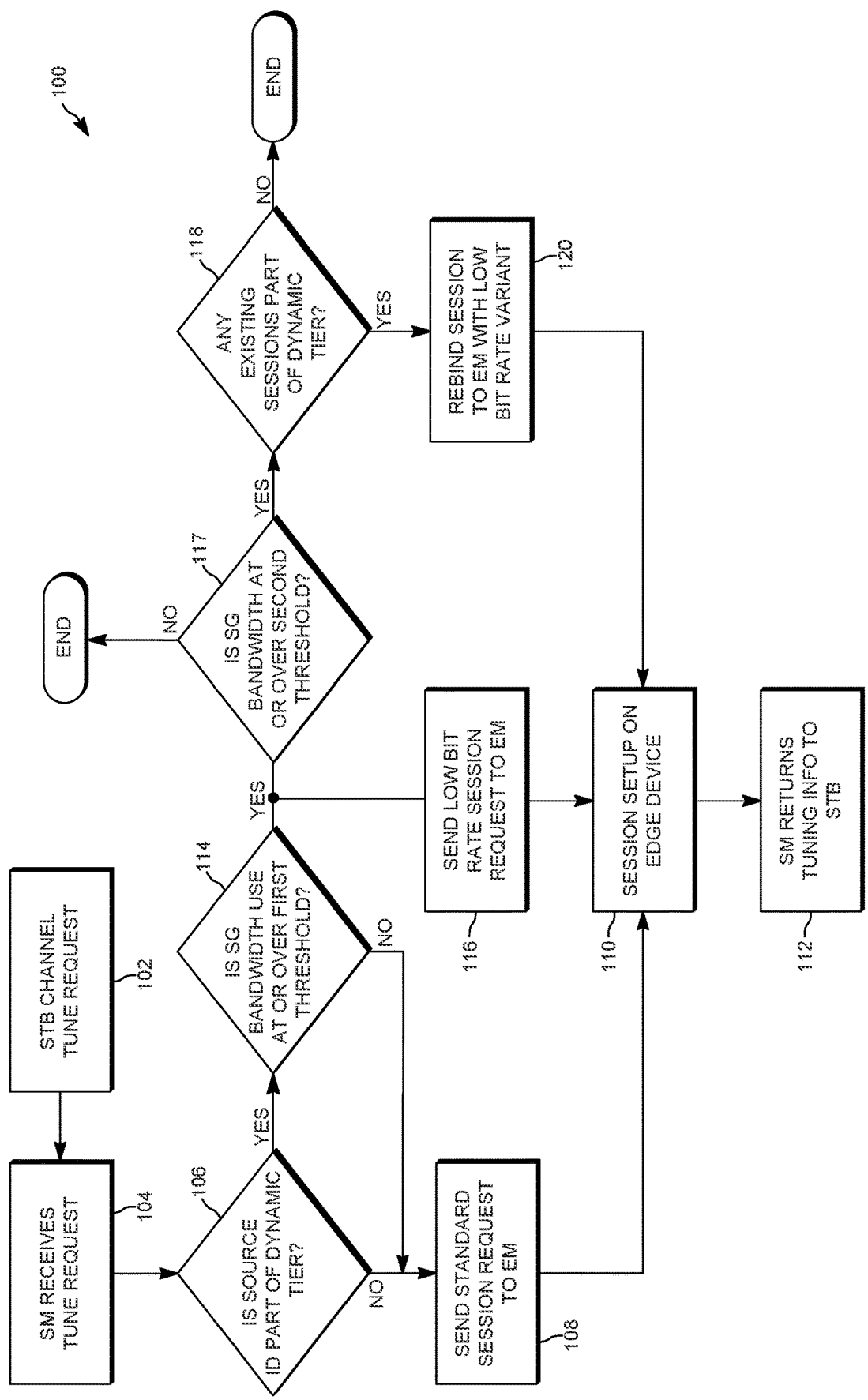
FIG. 2 is a flowchart showing an example of a method of actively managing video bandwidth with the SDV system of FIG. 1 based on current bandwidth use.
Figure 3:
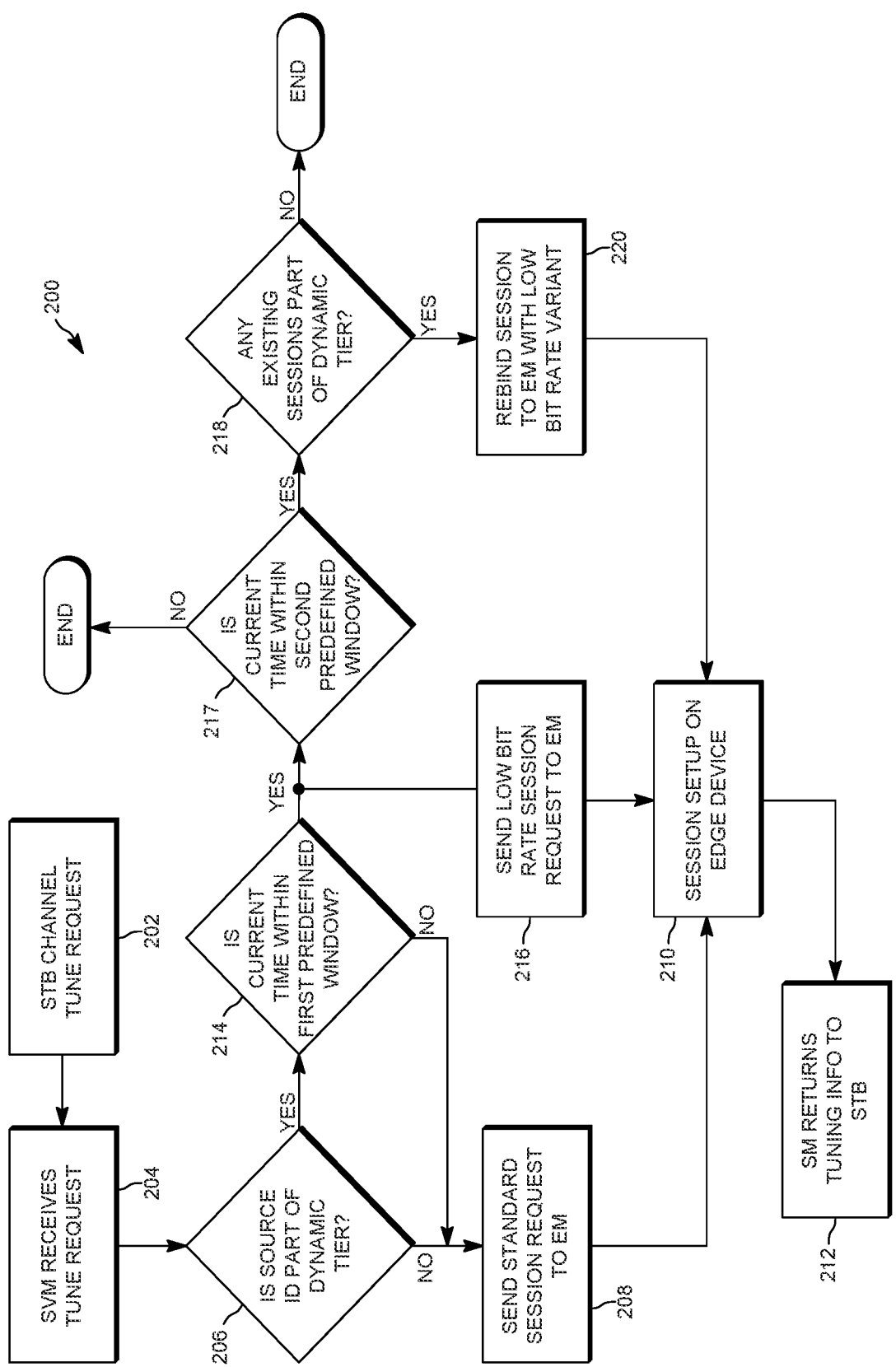
FIG. 3 is a flowchart showing another example of a method of actively managing video bandwidth with the SDV system of FIG. 1 based on scheduled time use.
Figure 4:
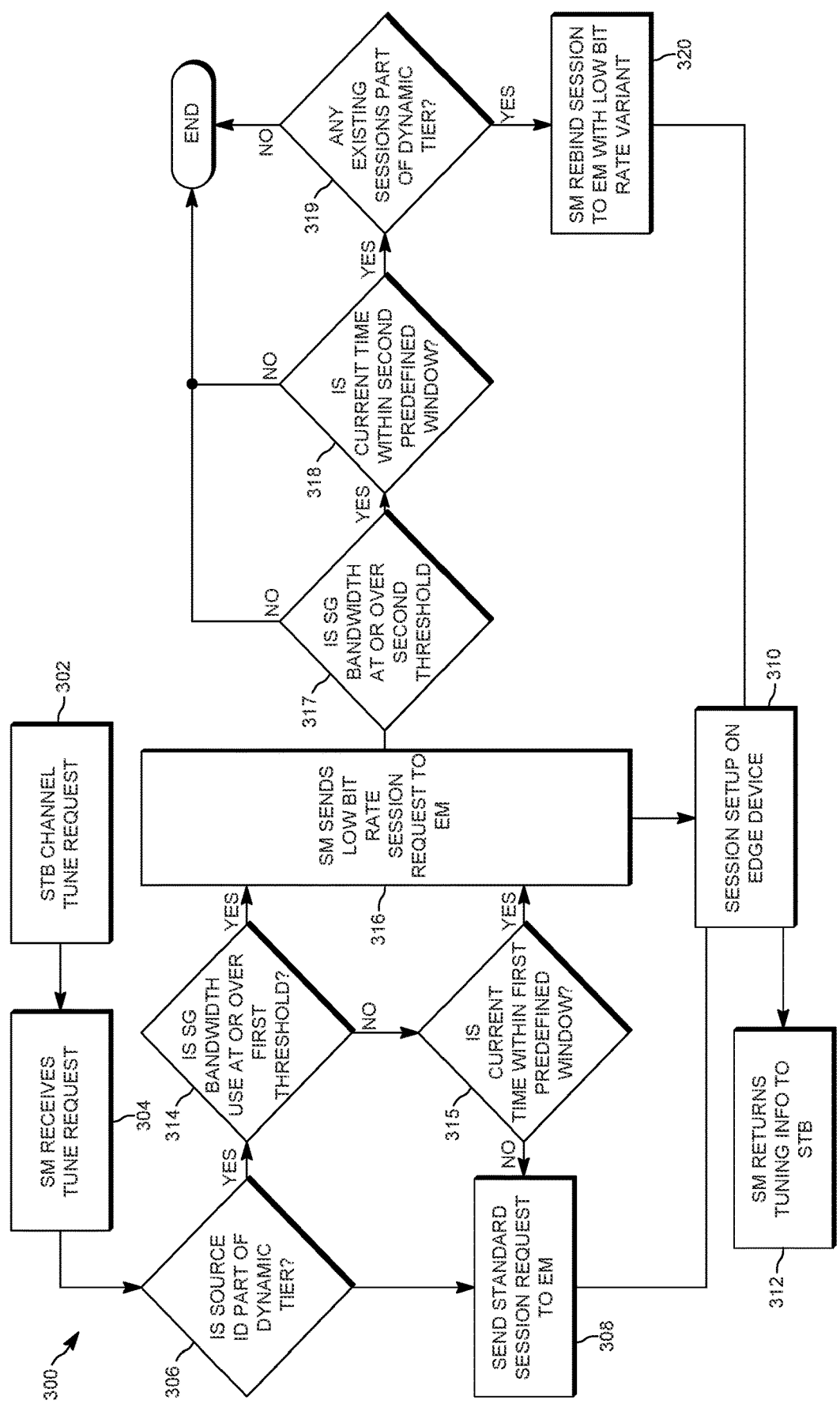
FIG. 4 is a flowchart showing a further example of a method of actively managing video bandwidth with the SDV system of FIG. 1 based on current bandwidth use and scheduled time use.

Referring to FIGS. 2-4, examples of methods of managing narrowcast bandwidth with a SDV system, such as system 10, are shown. Prior to the methods, a collection of SDV source channels that have two or more bitrate profiles, such as a standard or high bitrate profile and one low bitrate profile, is created via transcoders, rate shaping products, and/or other suitable equipment. The profiles can additionally, or alternatively, include other, more efficient codecs (such as MPEG-4 or HEVC) in addition to MPEG-2. If the SDV client requesting the service supports the newer, more efficient codec, it could use that version of the content to save bandwidth without compromising video quality. The above channels may be referred to as belonging to a "dynamic tier" or "dynamic channel tier." The above channels may be sourced from those channels that can tolerate low (or lower) bitrate profiles without any significant loss of quality. Although particular steps are shown in the examples of FIGS. 2-4, other examples of the methods may add, omit, modify, or substitute one or more steps. Additionally, other examples of the methods may have a different order or sequence of steps instead of the particular sequence of steps shown in FIGS. 2-4.

Referring to method 100 in FIG. 2, a requesting STB sends a channel tune request at 102, which is received by the SM at 104. At step 106, the tune request is reviewed to determine if the source ID is part of the dynamic tier. If the source ID is not part of the dynamic tier (i.e., not a source channel with two or more bitrate profiles), then a standard session request is sent to the EM at 108, a session setup is performed on the edge device at 110, and the SM returns tuning information to the requesting STB at 112.

If the source ID is part of the dynamic tier (i.e., a source channel with two or more bitrate profiles), it is determined whether the current bandwidth use for the service group that the requesting STB is part of is at or over a first predetermined threshold at 114. If the current bandwidth use is at or over the first predetermined threshold, a low bitrate session request is sent to the EM at 116, the session setup is performed on the edge device at 110, and the SM returns tuning information to the requesting STB at 112. Additionally, if the current bandwidth use is at or over the first predetermined threshold, it is determined whether the current bandwidth use for the service group that the requesting STB is part of is at or over a second predetermined threshold at 117. If the current bandwidth use is at or over the second predetermined threshold, it is determined whether any existing sessions are part of the dynamic tier at 118. If there are existing sessions that are part of the dynamic tier, there is a rebinding of those sessions to the EM with the low bitrate variant at 120. As part of the rebinding operation, the low bitrate sessions may be reallocated across narrowcast QAMs. If the current bandwidth use is under the second predetermined threshold or there are no existing sessions that are part of the dynamic tier, then there is no rebinding of those sessions. The first and second predetermined thresholds may be the same or different. For example, the second predetermined threshold may be higher than the first predetermined threshold to reduce the frequency of rebinding sessions to the EM with the low bitrate variant.

If the current bandwidth use is under the first predetermined threshold, then a standard session request is sent to the EM at 108, a session setup is performed on the edge device at 110, and the SM returns tuning information to the requesting STB at 112.

For example, a cable operator has defined 300 SDV channels in their system with 30 channels belong to the dynamic tier and having two bitrate variants of a normal or high bitrate of 3.75 Mbps and a low bitrate variant of 2.00 Mbps. The operator has defined a total of 16 narrowcast QAMs (38.8 Mbps each) per service group for video on-demand (VOD) and SDV services, which totals 620.80 Mbps maximum bandwidth in each service group. Additionally, the operator has defined an 80% first and second utilization threshold (496.64 Mbps) in each service group. When that threshold is met or exceeded, this would trigger active bandwidth management to begin. The SDV would then look for any existing tuned channels that are part of the dynamic channel tier and will rebind those sessions to their low bitrate profiles. For example, the session manager finds 11 channels currently streaming that have low bitrate options and directs the edge manager to rebind those 11 streams to low bitrate options. As part of the rebinding operation, the low bitrate sessions may be reallocated across narrowcast QAMs, As a result, the bandwidth utilized for those channels may be reduced from 41.25 Mbps to 22 Mbps, which reclaims 19.25 Mbps for additional services.

Additionally, any new session requests belonging to the dynamic tier would use the low bitrate profile. When utilization drops below the 80% threshold, then the sessions and edge managers may then rebind any low bitrate services to the normal bitrate profile and direct any new requests to the normal bitrate service. This may occur immediately or after a pre-defined time (e.g., after 1 hour of being below the threshold). In other examples, the operator may use 80% as the first utilization threshold and 85% as the second utilization threshold. When the 80% threshold is met or exceeded, only new session requests will use the low bitrate profile. However, when the 85% threshold is met or exceeded, there is rebinding of the existing tuned channels that are part of the dynamic channel tier.

Referring to method 200 in FIG. 3, a requesting STB sends a channel tune request at 202, which is received by the SM at 204. At step 206, the tune request is reviewed to determine if the source ID is part of the dynamic tier. If the source ID is not part of the dynamic tier (i.e., not a source channel with two or more bitrate profiles), then a standard session request is sent to the EM at 208, a session setup is performed on the edge device at 210, and the SM returns tuning information to the requesting STB at 212.

If the source ID is part of the dynamic tier (i.e., a source channel with two or more bitrate profiles), it is determined whether current time or time of the channel tune request (e.g., time when the channel tune request is received by the SM or when the channel tune request is sent or transmitted by the requesting STB) is within a first predetermined window or first predetermined time window at 214. If the current time is within the first predetermined window, a low bitrate session request is sent to the EM at 216, the session setup is performed on the edge device at 210, and the SM returns tuning information to the requesting STB at 212. Additionally, if the current time is within a second predetermined window or second predetermined time window at 217, it is determined whether any existing sessions are part of the dynamic tier at 218. If there are existing sessions that are part of the dynamic tier, there is a rebinding of those sessions to the EM with the low bitrate variant at 220. As part of the rebinding operation, the low bitrate sessions may be reallocated across narrowcast QAMs. If current time is outside the second predetermined window or there are no existing sessions that are part of the dynamic tier, then there is no rebinding of those sessions.

If the current time is outside the first predetermined window, then a standard session request is sent to the EM at 208, a session setup is performed on the edge device at 210, and the SM returns tuning information to the requesting STB at 212. The first and second predetermined windows may be the same or different. For example, the second predetermined window may be smaller or narrower (i.e., shorter time duration from start to end of the window) than the first predetermined window to reduce rebinding sessions to the EM with the low bitrate variant.

Referring to method 300 in FIG. 4, a requesting STB sends a channel tune request at 302, which is received by the SM at 304. At step 306, the tune request is reviewed to determine if the source ID is part of the dynamic tier. If the source ID is not part of the dynamic tier (i.e., not a source channel with two or more bitrate profiles), then a standard session request is sent to the EM at 308, a session setup is performed on the edge device at 310, and the SM returns tuning information to the requesting STB at 312.

If the source ID is part of the dynamic tier (i.e., a source channel with two or more bitrate profiles), it is determined whether the current bandwidth use for the service group that the requesting STB is part of is at or over a first predetermined threshold at 314. If the current bandwidth use is at or over the first predetermined threshold, a low bitrate session request is sent to the EM at 316, the session setup is performed on the edge device at 310, and the SM returns tuning information to the requesting STB at 312. If the current bandwidth use is under the first predetermined threshold, it is determined whether the current time (e.g., time of the tune request) is within a first predetermined window at 315. If the current time is within the first predetermined window, a low bitrate session request is sent to the EM at 316, the session setup is performed on the edge device at 310, and the SM returns tuning information to the requesting STB at 312.

Additionally, if the current bandwidth use for the service group that the requesting STB is part of is at or over the first predetermined threshold or the current time is within the first predetermined window, it is determined whether the current bandwidth use for the service group that the requesting STB is part of is at or over a second predetermined threshold at 317, and whether the current time is within a second predetermined window at 318. If the current bandwidth use is at or over the second predetermined threshold and the current time is within the second predetermined window, then it is determined whether any existing sessions are part of the dynamic tier at 319. If there are existing sessions that are part of the dynamic tier, there is a rebinding of those sessions to the EM with the low bitrate variant at 320. As part of the rebinding operation, the low bitrate sessions may be reallocated across narrowcast QAMs. If the current bandwidth use is under the second predetermined threshold, the current time is outside the second predetermined window, or there are no existing sessions that are part of the dynamic tier, then there is no rebinding of those sessions. If the current bandwidth use for the service group that the requesting STB is part of is under the first predetermined threshold and the current time is outside the first predetermined window, then a standard session request is sent to the EM at 308, a session setup is performed on the edge device at 310, and the SM returns tuning information to the requesting STB at 312. The first and second predetermined thresholds may be the same or different. For example, the second predetermined threshold may be higher than the first predetermined threshold to reduce the frequency of rebinding sessions to the EM with the low bitrate variant. Additionally, the first and second predetermined windows may be the same or different. For example, the second predetermined threshold may be smaller (i.e., shorter duration) than the first predetermined threshold to reduce rebinding sessions to the EM with the low bitrate variant.

Methods 100, 200, and/or 300 may alternatively, or additionally, include other steps and/or may omit one or more steps. For example, if the current bandwidth use was at or over the first and/or second predetermined thresholds and is now under the first and/or second predetermined thresholds (or a previous channel tune request was within the first and/or second predetermined windows and the current channel tune request is outside the first and/or second predetermined windows), there may be rebinding of one or more of existing sessions that are part of the dynamic tier with their high bitrate variant (instead of their low bitrate variant) immediately or after a predetermined amount of time. For example, the rebinding of one or more of the existing sessions may occur only after there is a predetermined amount of time in which the current bandwidth use is under the first and/or second predetermined thresholds. Alternatively, the rebinding of one or more existing sessions may occur only after the current time is outside the predefined window and the current bandwidth use is under the first and/or second predetermined thresholds. Additionally, method 300 may, for example, omit steps 314, 315, 317, and/or 318 in any combination. For example, another embodiment of method 300 omits step 314 so the initial determination is for only the current time of the request (and not also for the current bandwidth use of the service group) and omits steps 318 so the second determination is for only the current bandwidth use of the service group (and not also for the current time).

Figure 5:
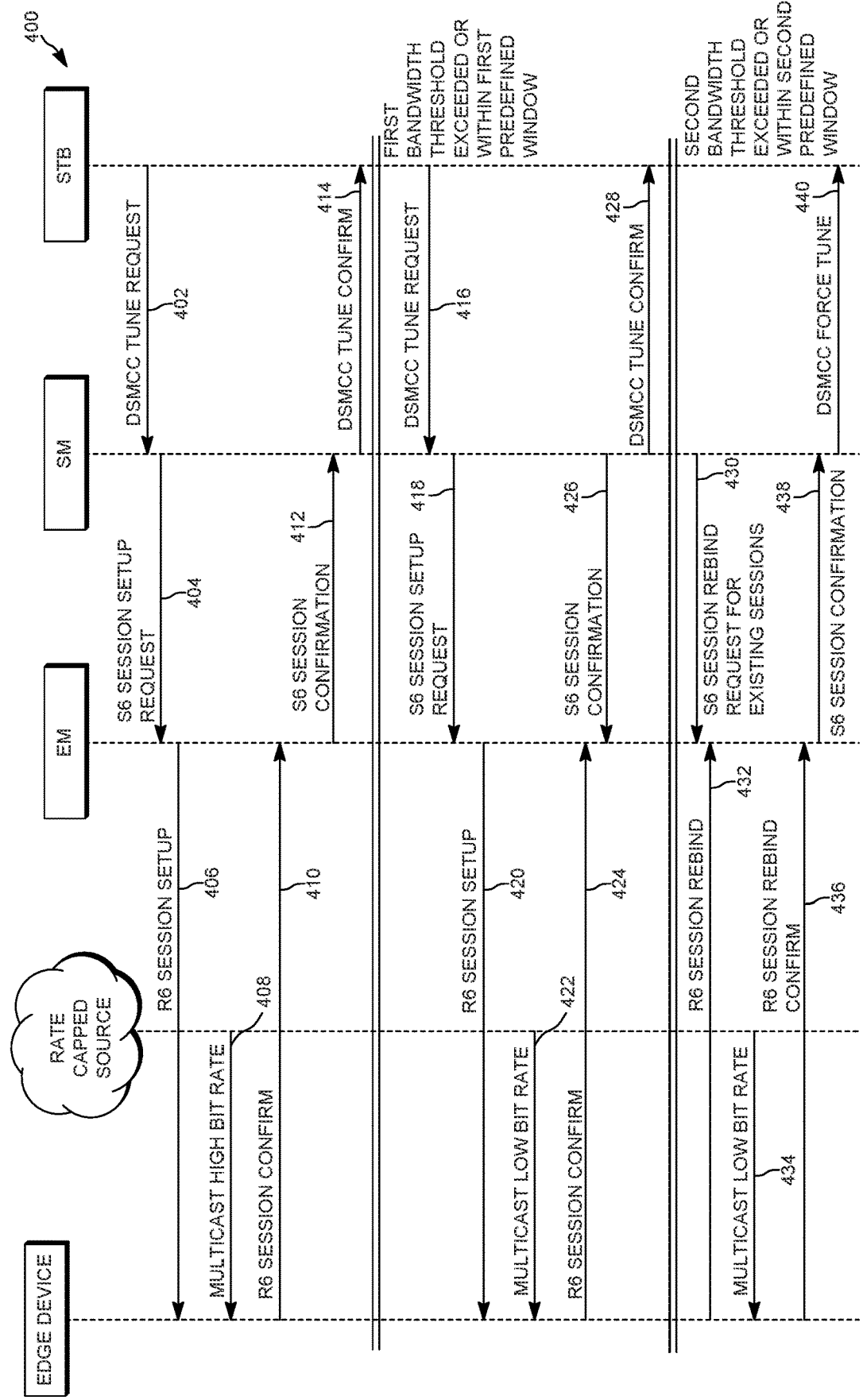
FIG. 5 is a message flow diagram showing an example of a method in which the SDV system of FIG. 1 actively manages video bandwidth.

Referring to FIG. 5, a message flow diagram illustrating method 100 in FIG. 2 is generally indicated at 400. First, a set top box (STB) sends a tune request requesting an SDV channel to the session manager (SM) at 402. The SM responds by sending a session setup request to the edge manager (EM) at 404, which in turn sends a session setup request at the high bitrate to the edge device at 406. The edge device joins the high bitrate session of the multicast from the rate capped source (e.g., content source(s), content delivery network, etc.) at 408. The edge device then sends a session confirm message at 410 to the EM, which in turn sends a session confirmation message to the SM at 412. Finally, the SM sends a tune confirm message to the STB at 414.

When current bandwidth use for a service group meets or exceeds a first predetermined threshold, then the message flow is described below. If a STB sends a tune request and that STB is not associated with a service group that has met or exceeded the first predetermined threshold for current bandwidth use, then the message flow proceeds as shown above for messages 402 to 414. However, if a STB sends a tune request at 416 and that STB is associated with a service group that has met or exceeded the first predetermined threshold for current bandwidth use, then the subsequent messages are described below.

The SM responds to the tune request by sending a session setup request to the edge manager (EM) at 418, which in turn sends a session setup request at the low bitrate to the edge device at 420. In response, the edge device joins the low bitrate multicast of the rate capped source (e.g., content source(s), content delivery network, etc.) at 422. The edge device then sends a session confirm message at 424 to the EM, which in turn sends a session confirmation messages to the SM at 426. Finally, the SM sends a tune confirm message to the STB at 428.

Additionally, if the current bandwidth use exceeds a second predetermined threshold, the SM sends a session rebind request to the EM at 430, which in turn sends a session rebind message for existing sessions having a low bitrate profile to the edge device at 432. The rate capped source multicasts the low bitrate sessions to the edge device at 434. The edge device then sends a session rebind confirm message at 436 to the EM, which in turn sends a session confirmation messages to the SM at 438. The rebind may involve rebalancing sessions across QAMs to maximize the QAM utilization in order to better realize bandwidth savings. Finally, the SM sends a force tune message to the STB at 440. The first and second predetermined thresholds may be the same or different. For example, the second predetermined threshold may be higher than the first predetermined threshold to reduce the frequency of rebinding sessions to the EM with the low bitrate variant.

The SDV system can monitor one or more parameters relative to first and/or second predetermined thresholds or windows, other than or in addition to current bandwidth use and time, and use low bitrate profiles of sessions/programs when those parameter(s) exceed the first and/or second predetermined thresholds or are within the first and/or second predetermined windows. Additionally, the SDV system also may be manually switched to provide sessions/programs with low bitrate profiles and/or to rebind existing sessions/programs to their low bitrate profiles, and then manually switched back to provide sessions/programs with high bitrate profiles and/or to rebind existing sessions/programs to their high bitrate profiles. The above provides cable operators with a more efficient method of actively managing narrowcast bandwidth by reducing the overall number of dedicated narrowcast QAMs, freeing up more bandwidth for other service, and maintaining sufficient bandwidth to accommodate, for example, peak usage periods, to prevent service denials.

Referring to FIG. 6, a block diagram of an example of a computing apparatus 600 is shown. The computing apparatus may be configured to implement or execute one or more of the processes performed by any of the various devices shown herein, including the set top box(es), the session manager(s), the edge manager(s), the edge device(s), the management console(s), etc. of the present disclosure. The illustration of the computing apparatus 600 is a generalized illustration and that the computing apparatus 600 may include additional components and that some of the components described may be removed and/or modified without departing from a scope of the computing apparatus 600.

The computing apparatus 600 includes a processor 602 that may implement or execute some or all of the steps described in the methods described herein. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 410 and/or a removable storage drive 612, where a copy of the program code for one or more of the processes depicted in FIGS. 2-5 may be stored. The removable storage drive 612 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method for managing narrowcast bandwidth, comprising:
   receiving a channel tune request from a set top box associated with a service group;
   determining whether time of the channel tune request is within a first predefined window;
   multicasting a high bitrate version of the requested channel to the set top boxes of the service group when the time of the channel tune request is outside the first predefined window;
   multicasting a low bitrate version of the requested channel to the set top boxes of the service group when the time of the channel tune request is within the first predefined window; and
   determining whether time of the channel tune request is within a second predefined window, different than the first predetermined window;
   identifying existing sessions that are multicasting high bitrate versions and that also have low bitrate versions;
   rebinding existing multicasting sessions with their low bitrate versions when the time of the channel tune request is within the second predefined window; and multicasting the low bitrate versions to the set top boxes of the service group.

2. The method of claim 1, further comprising:
identifying existing sessions that are multicasting low bitrate versions and that also have high bitrate versions;
rebinding one or more of the existing multicasting sessions with their high bitrate versions when the time of the channel tune request is outside the second predefined window; and
multicasting the high bitrate versions of the one or more existing multicasting sessions to the set top boxes of the service group.

3. The method of claim 2, further comprising determining whether current total bandwidth use by the service group is under a predetermined threshold, wherein rebinding one or more of the existing multicasting sessions with their high bitrate versions occurs when the time of the channel tune request is outside the second predefined window and the current total bandwidth use is under the predetermined threshold.

4. The method of claim 1, further comprising:
identifying existing sessions that are multicasting low bitrate versions and that also have high bitrate versions;
rebinding one or more of the existing multicasting sessions with their high bitrate versions when the time of the channel tune request is outside the first predefined window; and
multicasting the high bitrate versions of the one or more existing multicasting sessions to the set top boxes of the service group.

5. The method of claim 4, further comprising determining whether current total bandwidth use by the service group is under a predetermined threshold, wherein rebinding one or more of the existing multicasting sessions with their high bitrate versions occurs when the time of the channel tune request is outside the first predefined window and the current total bandwidth use is under the predetermined threshold.

6. The method of claim 1, further comprising:
determining whether current total bandwidth use by the service group is at or above a predetermined threshold;
identifying existing sessions that are multicasting high bitrate versions and that also have low bitrate versions;
rebinding existing multicasting sessions with their low bitrate versions when the current total bandwidth use by the service group is at or above the predetermined threshold; and
multicasting the low bitrate versions to the set top boxes of the service group.

7. The method of claim 6, further comprising:
identifying existing sessions that are multicasting low bitrate versions and that also have high bitrate versions;
rebinding one or more of the existing multicasting sessions with their high bitrate versions when the current total bandwidth use by the service group is under the predetermined threshold; and
multicasting the high bitrate versions of the one or more existing multicasting sessions to the set top boxes of the service group.

8. The method of claim 6, further comprising:
identifying existing sessions that are multicasting low bitrate versions and that also have high bitrate versions;
rebinding one or more of the existing multicasting sessions with their high bitrate versions when the current total bandwidth use by the service group is under the predetermined threshold and the time of the channel tune request is outside the first predefined window; and
multicasting the high bitrate versions of the one or more existing multicasting sessions to the set top boxes of the service group.

9. The method of claim 6, further comprising:
identifying existing sessions that are multicasting low bitrate versions and that also have high bitrate versions;
rebinding one or more of the existing multicasting sessions with their high bitrate versions when the current total bandwidth use by the service group is under the predetermined threshold for at least a predetermined amount of time and the time of the channel tune request is outside the first predefined window; and
multicasting the high bitrate versions of the one or more existing multicasting sessions to the set top boxes of the service group.

* * * * *